United States Patent

Courbot et al.

[11] Patent Number: 4,467,898
[45] Date of Patent: Aug. 28, 1984

[54] DISC BRAKE

[75] Inventors: Pierre Courbot, Villiers le Bel; Jean-Jacques Carré, Montreuil, both of France

[73] Assignee: Societe Anonyme DBA, Paris, France

[21] Appl. No.: 252,565

[22] Filed: Apr. 9, 1981

[30] Foreign Application Priority Data

Dec. 5, 1979 [FR] France ................ 79 29852

[51] Int. Cl.³ ............................................. F16D 65/09
[52] U.S. Cl. ............................ 188/73.44; 188/73.34
[58] Field of Search ............... 188/71.1, 73.31, 73.32, 188/73.33, 73.34, 73.35, 73.38, 73.44, 205 A

[56] References Cited

U.S. PATENT DOCUMENTS

| 3,612,227 | 10/1971 | Schaftner et al. | 188/73.35 |
| 3,684,061 | 8/1972 | Ogawa et al. | 188/73.37 |
| 3,865,215 | 2/1975 | Burgdorf et al. | 188/73.33 |
| 3,893,546 | 7/1975 | Kestermeier et al. | 188/73.44 |
| 3,942,612 | 3/1976 | Le Marchand et al. | 188/73.33 |
| 4,046,233 | 9/1977 | Klassen | 188/73.44 |
| 4,109,766 | 8/1978 | Inoue et al. | 188/73.34 |
| 4,189,032 | 2/1980 | Farr | 188/73.44 |

FOREIGN PATENT DOCUMENTS

| 2713360 | 9/1977 | Fed. Rep. of Germany ... 188/73.34 |
| 2717652 | 10/1978 | Fed. Rep. of Germany ... 188/73.36 |
| 2240382 | 3/1975 | France . |
| 2262226 | 9/1975 | France . |
| 2417680 | 9/1979 | France . |
| 2422863 | 11/1979 | France . |
| 1532572 | 11/1978 | United Kingdom ............ 188/73.44 |

Primary Examiner—Bruce H. Stoner, Jr.
Assistant Examiner—Robert J. Oberleitner
Attorney, Agent, or Firm—Ken C. Decker; Paul David Schoenle

[57] ABSTRACT

A disc brake includes a caliper slidably mounted on a fixed support through an axial column projecting from the fixed support. Rotation of the caliper about the axial column is prevented by the engagement of complimentary axial sliding surfaces on the caliper and on the fixed support. Upon axial movement of the caliper with respect to the fixed support in excess of a predetermined distance, the sliding surfaces may be disengaged, thereby permitting the caliper to swing about the column so that the friction elements may be replaced. Movement of the caliper with respect to the fixed support is normally kept to a distance less than the predetermined distance by a stop pin carried by the caliper.

8 Claims, 6 Drawing Figures

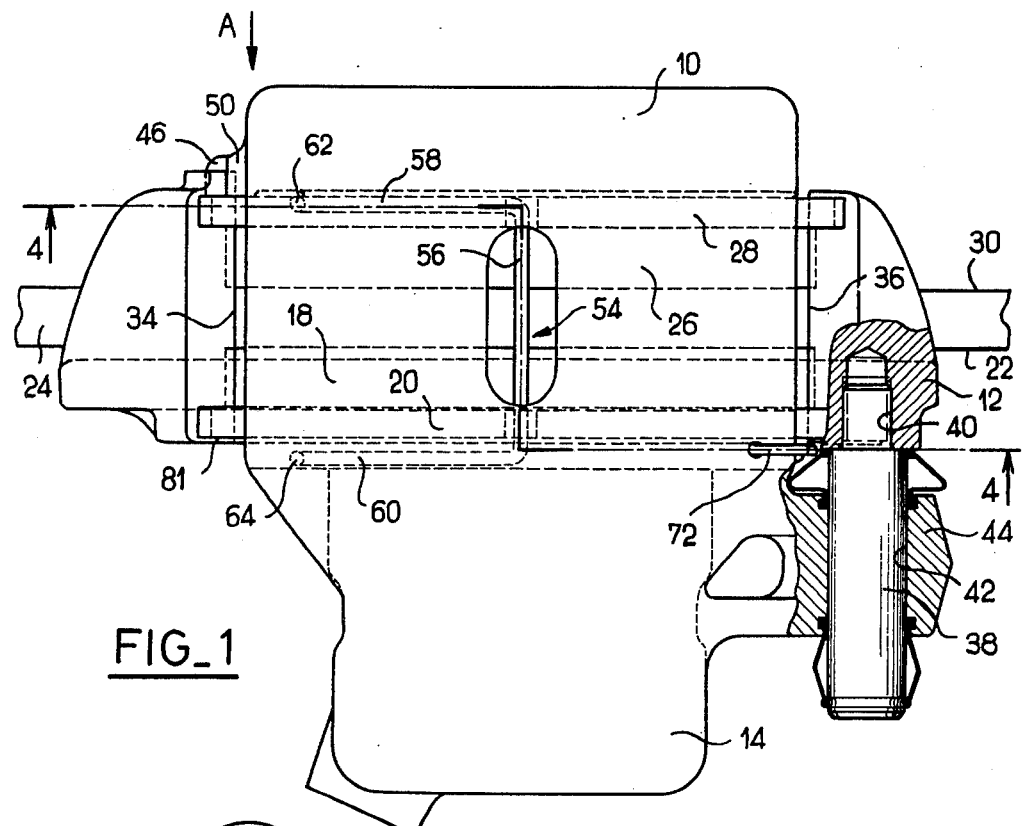
FIG_1
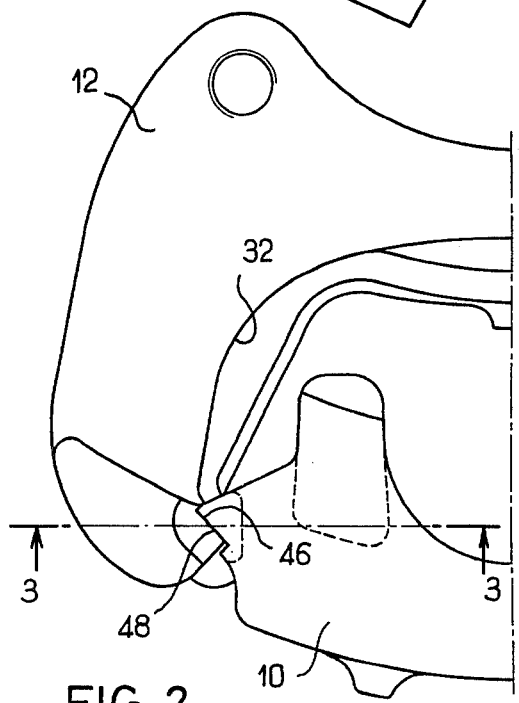
FIG_2
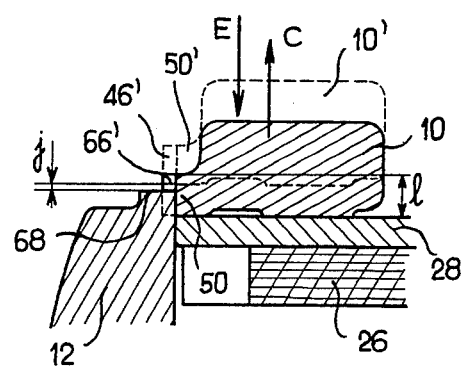
FIG_3

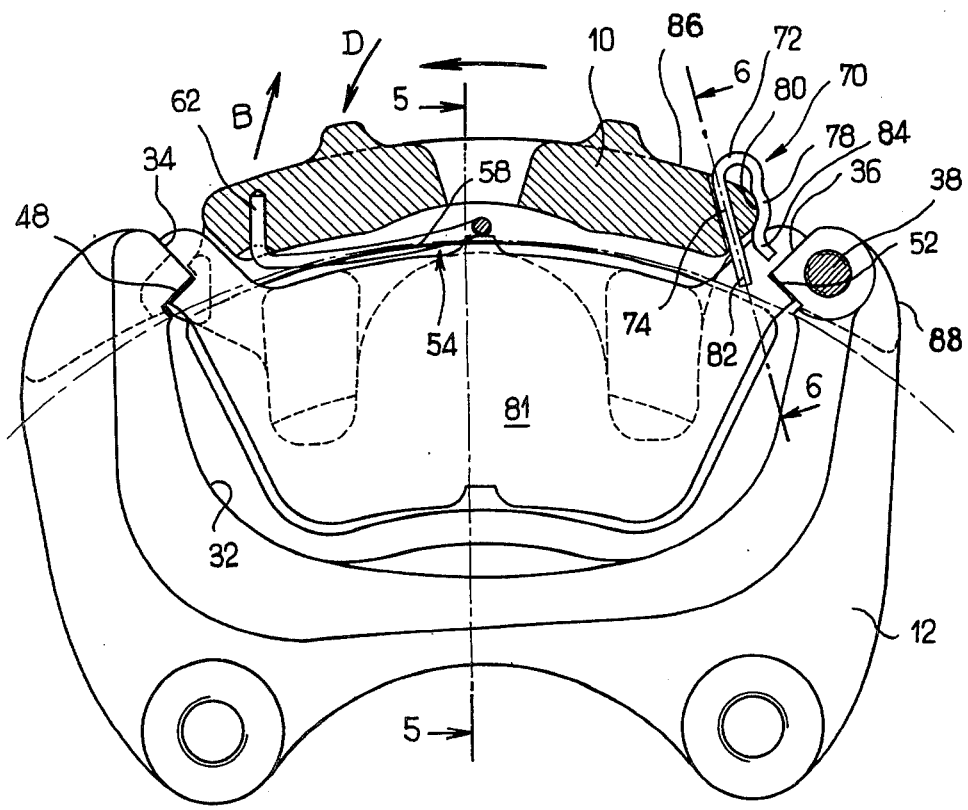
FIG_4

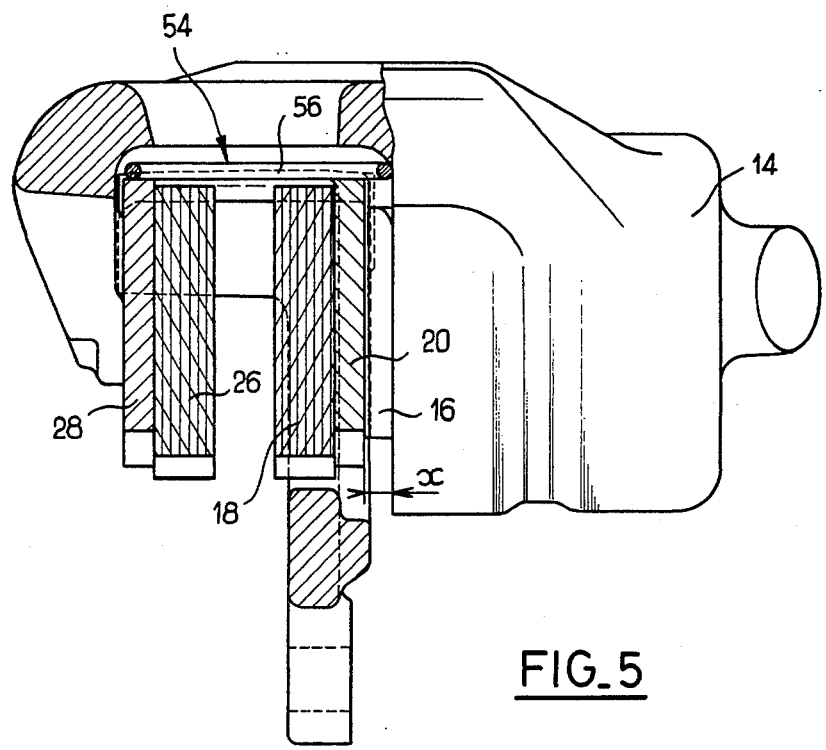
FIG_5
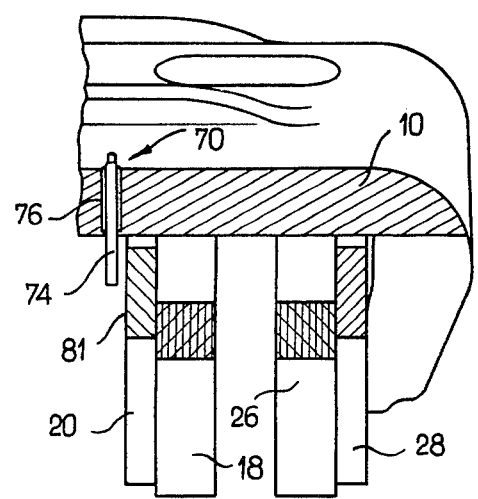
FIG_6

DISC BRAKE

The object of the present invention is a disc brake.

The invention more particularly concerns a disc brake whose caliper is mounted to slide on a fixed support in an aperture in which two friction members are received for anchoring and for axial sliding which are able to come into frictional engagement with the opposing faces of a turning disc upon actuation of a brake actuator acting directly on one of the friction members and, by reaction through the sliding caliper, on the other friction member.

The sliding connection between the caliper and the fixed support can be ensured by means of a pair of columns. The columns are fixed, either to the caliper or to the fixed support, and are received slidingly in bores formed in the fixed support or in the caliper. In this type of sliding, the resistance to the sliding of the caliper with respect to the fixed support, originating either from corrosion phenomena or from dirt present between the small columns and the bores, can be avoided by means of sealing protection bellows protecting the columns and their bores. However, in this sort of sliding, it is necessary for the columns and the bores facing them to be perfectly aligned and parallel. Any failure in alignment or parallelism immediately affects the quality of the caliper's sliding on the fixed support and uneven braking results, with uneven wear on the friction element.

To remedy these disadvantages, it has been proposed that the sliding connection between the caliper and the fixed support be realised by means of a single column mounted on one side of the caliper and by means of plane complementary sliding surfaces formed on the other side of the caliper so as to limit swinging movements of the caliper about the column. With this type of brake, the plane sliding surfaces are open to the environment subject to accumulated dirt and to corrosion. In certain cases, these sliding surfaces can be self-cleaning through the sliding movements and the relative vibrations of the surfaces.

However, with this type of brake, replacement of friction members, when the friction pads associated with them are worn out, is a complicated procedure, necessitating de-mounting either of the column or of the guiding key of the caliper by axial translation of the latter. In addition, this type of brake is generally provided with resilient means for keeping the said sliding surfaces in contact and anti-noise springs acting on the friction members. So replacement of the friction members obviously necessitates demounting and remounting of many components.

The invention proposes a disc brake of the sliding caliper type, in which the replacement of friction members is a simple operation and which offers every guarantee of reliability as regards correct remounting of the components of the brake overall.

To this end, the invention proposes a disc brake whose caliper is mounted on a fixed support in an aperture in which two friction members are received for anchoring and for axial sliding which are able to come into frictional engagement with the opposing faces of a turning disc upon actuation of a brake actuator acting directly on one of the friction members and, by reaction through the sliding caliper, on the other friction member, said caliper being mounted slidingly by means of an axial column fixed to the caliper or to the fixed support and which cooperates with a bore formed opposite to it in the fixed support or in the caliper and by means of two complementary, axially sliding surfaces, formed on the caliper and on the fixed support, as to allow relative movements of the caliper with respect to the fixed support while opposing swinging of the caliper about said column when the caliper is in its normal working position and so as to allow swinging of the latter when extraction of the said friction members is required, resilient means being provided to keep the said complementary surfaces in contact, characterized in that one of said axially sliding surfaces presents a limited length such that an axial displacement of the caliper with respect to the fixed support over a distance greater than said limited length allows swinging of the caliper about said column, said resilient means being constituted by a spring disposed between the said caliper and the said friction members.

The invention will now be described by way of example with reference to the attached drawings, in which:

FIG. 1 is a view from above of a disc brake made in conformity with the teachings of the present invention;

FIG. 2 is a partial view along the arrow A of FIG. 1;

FIG. 3 is a partial view in section at the line 3—3 of FIG. 2;

FIG. 4 is a view in section at the line 4—4 of FIG. 1;

FIG. 5 is a partial view in section at the line 5—5 of FIG. 4; and

FIG. 6 is a partial view in section at the line 6—6 of FIG. 4;

The disc brake represented in FIGS. 1 to 6 includes a movable frame or caliper 10 mounted to slide on a fixed support member 12. Control means, constituted in the embodiment represented by an hydraulic brake actuator 14, are associated with the caliper 10 and disposed so as to urge directly by means of a piston 16 a friction member 18, having backing plate 20, against a first face 22 of a brake disc 24 associated with a vehicle wheel (not represented). By reaction, upon actuation of the brake actuator 14 and its piston 16, the caliper 10 urges a second friction member 26 having backing plate 28, against the second face 30 of the brake disc 24.

As shown in FIGS. 1 to 5 in particular, the fixed support 12 is provided with an aperture 32 whose circumferentially spaced edges 34 and 36 support the friction members 18 and 26 for anchoring and sliding, so that the fixed support 12 constitutes a torque support member for the latter.

The caliper 10 is mounted to slide on the fixed support 12 by means of an axial column 38. In the embodiment represented and as shown more particularly in FIG. 1, the column 38 is connected to the fixed support 12 by a threaded connection 40. The small column 38 is received slidingly in a bore 42 formed in an arm 44 of the caliper 10.

The caliper 10 cooperates slidingly with the fixed support 12 by means of two complementary, axially sliding surfaces 46 and 48. The plane sliding surface 46 is formed on a projection 50 of the caliper 10 which extends parallel to the disc 24 on the side opposite to the arm 44. The complementary surface 48 is formed on the fixed support 12. As FIGS. 1 and 4 show, the axial sliding surface 48 cooperates with the circumferential edge 34 of the aperture 32 so as to allow anchoring and sliding of the friction members 18 and 26. An axial sliding surface 52 has been provided symmetrically which cooperates with the circumferential edge 36. The disc brake represented in FIGS. 1 to 6 is in its normal working position. In this position and as FIGS. 2 and 3 show more particularly, the contact between the surfaces 46 and 48 are kept in contact by means of a spring 54. The spring 54 is substantially C-shaped. The central arm 56 of the C extends parallel to the axis of rotation of the disc and bears on the upper peripheral edges of the support plates 20 and 28 of the friction members 18 and 26 (see FIG. 5). The end arms 58 and 60 of the spring 54 are provided at their ends with extensions 62 and 64, respectively, which fit into the corresponding bores formed opposite then in the caliper 10. The spring 54 is thus fixed to the caliper 10 and remains solid with the latter on de-mounting of the brake. As FIG. 4 shows, the spring 54 bears on the support plates and urges the caliper 10 in the direction indicated by the arrow B. It is thus seen that the resilient means constituted by the spring 54 have a first function of keeping the surfaces 34 and 36 and thus opposes any parasitic vibration which may appear in the friction members and the fixed support.

In conformity with the invention the sliding surface 46 formed by the caliper presents a limited axial length "1" (see FIG. 3). The caliper 10 has been represented in FIG. 3 in its normal working position as well as in the position it occupies when the caliper is required to be swung about the column 38 so that friction members can be replaced. In this latter position, marked by identical references with the addition of a "'", there is a functional play "j" between the transverse edge 68 of the sliding surface 48 and the transverse edge 66' of the sliding surface 46'. This play "j" allows the caliper 10 to be made to swing about the column 38 and thereby clear access to the friction members 18 and 26 when replacement of the latter is required.

In order to avoid any accidental swinging of the caliper 10 when the latter is in its normal working position, removable axial stop means associated with the caliper have been provided. In fact, it is desirable to avoid an axial displacement of the caliper in the direction indicated by the arrow C over a distance greater than the length "1" when the components are all in their normal working position. To this end and in conformity with the invention, means forming a stop 70 have been provided. These means forming a stop are constituted by a pin 72 made of metal wire. The pin 72 is substantially in the shape of a hair-pin, one arm 74 of which is introduced into a bore 76 formed in the caliper 10, and the other arm 78 of which cooperates resiliently with the edge 80 of the caliper 10 so as to ensure immobilisation of the pin.

As can be verified from FIGS. 1, 4 and 6, the pin 72 cooperates with the unequipped face 81 of the support plate 20 of the friction member 18. The face 81 constitutes an abutment surface on which the ends 82 and 84 of the arms 74 and 78 of the pin 72 come to bear when the caliper 10 moves in the direction indicated by the arrow C.

Replacement of the friction members 18 and 26 is carried out in the following way:

After the pin 72 has been withdrawn from the caliper 10, the caliper is displaced axially in the direction indicated by the arrow C to bring the caliper into the position indicated at 10' (see FIG. 3). As this displacement, the piston 16 returns into its bore until the distance "x" is equal to 0 (see FIG. 5). In the position 10', the caliper is able to swing about the column 38 in the direction indicated by the arrow B (FIG. 4). This swing is effected automatically under the action of the thrust applied to the caliper by the spring 54 which bears on the friction members 18 and 26. As the spring 54 is fixed to the caliper, it follows this in its swinging. When the caliper has reached its maximal position of swing in which the upper part 86 of the caliper comes to bear on the part 88 of the fixed support 12, The worn friction members can be extracted by being slid over the edges 34 and 36 of the aperture 32. New friction members are then mounted, being brought into contact with the corresponding surface 22 and 30 of the disc 12 by axial sliding. The caliper 10 is swung about the column 38 until the arm 56 of the spring 54 is in contact with the upper part of the support plates of the new friction members. In this position, force is applied to the caliper 10 in the direction indicated by the arrow D in order to compress the spring 54 and bring the caliper 10 into its position 10'. All that then remains to be done is to make the caliper slide in the direction indicated by the arrow E in order to bring the surface 46 opposite the surface 48. The force applied to the caliper is then eased off so as to bring the surfaces 46 and 48 into contact. All that then remains to be done is to put the pin 72 back in place in its bore 76 so as to avoid any accidental axial escape by the caliper in the direction A as described above.

We claim:

1. Disc Brake whose caliper (10) is mounted to slide on a fixed support (12) in an aperture (32) in which two friction members (18, 26) are received for anchoring and for axial sliding, which are able to come into frictional engagement with the opposite faces (22, 30) of a turning disc (24) upon actuation of a brake actuator (16) acting directly on one of the friction members (18) and, by reaction through the sliding caliper (10), on the other friction member (26), said caliper (10) being mounted to slide by means of an axial column (38) fixed to the fixed support (12) and which cooperates with a bore (40, 42) formed opposite to it in the caliper (10) and by means of two complementary, axially sliding surfaces (46, 48), formed on the caliper and on the fixed support, so as to allow relative axial movements of the caliper (10) with respect to the fixed support (12) while opposing swinging of the caliper about said column (38) when the caliper is in its normal working position and so as to allow swinging of the latter when extraction of the said friction members (18, 26) is required, resilient means (54) being provided to normally keep said complementary surfaces (46, 48) in mutual contact in said normal working position of said caliper, characterized in that one of said axially sliding surfaces (46) presents a limited axial length (l) such that a manually controlled axial displacement of the caliper (10) with respect to the fixed support (12) over a distance greater than said limited length (l) towards a disengaged position away of said normal working position allows swinging of the caliper (10) about said column (38) to permit servicing of the friction members (18, 26) without removing said column, said resilient means (54) being constituted by a spring disposed between said caliper (10) and said friction members (18, 26).

2. Disc brake according to claim 1, characterized in that it has removable stop means (70) normally limiting the axial displacement of the caliper (10) towards said disengaged position.

3. Disc brake according to claim 2, characterized in that the said stop means comprise a member (72) forming a stop, fixed de-mountably on the caliper (10) cooperating with an abutment surface (81) formed opposite on one of the said friction members (18, 26).

4. Disc brake according to claim 3, characterized in that said member (72) forming a stop is a pin of metal wire.

5. Disc brake according to claim 1, characterized in that said axially sliding surface (46) of limited length is formed on the caliper (10).

6. Disc brake according to claim 5 in which the friction members (18,26) are received to slide axially on two surfaces (48, 52) for anchoring and axial sliding, formed on spaced circumferential edges (34,36) defined on said aperture (32) in said fixed support (12), characterized in that said surface (46) of limited length formed on the caliper cooperates with one (48) of said surfaces for axial guiding of the friction members.

7. Disc brake according to claim 1, characterized in that said spring (54) is fixed to the caliper (10) and bears on the support plates (20, 28) of said friction members.

8. Disc brake according to claim 7, characterized in that said spring (54) is substantially C-shaped, having a central arm (56), a pair of end branches (58, 60) extending from said central arm, each of said end branches terminating in end sections (62, 64), said central arm (56) bearing on said support plates (20, 28) and said end sections (62, 64) being fixed to said caliper (10).

* * * * *